(12) United States Patent
Ignacio

(10) Patent No.: US 8,075,017 B2
(45) Date of Patent: Dec. 13, 2011

(54) TROLLEY

(76) Inventor: Wilhelmus Saleh Quintino Ignacio, Almere (NL)

( * ) Notice: Subject to any disclaimer, the term of this patent is extended or adjusted under 35 U.S.C. 154(b) by 0 days.

(21) Appl. No.: 11/630,990

(22) PCT Filed: Jun. 8, 2005

(86) PCT No.: PCT/NL2005/000412
§ 371 (c)(1),
(2), (4) Date: Feb. 13, 2007

(87) PCT Pub. No.: WO2006/001688
PCT Pub. Date: Jan. 5, 2006

(65) Prior Publication Data
US 2007/0296169 A1 Dec. 27, 2007

(30) Foreign Application Priority Data
Jun. 29, 2004 (NL) .................................... 1026525

(51) Int. Cl.
*B62B 7/06* (2006.01)
(52) U.S. Cl. .................... 280/642; 280/650; 280/33.991
(58) Field of Classification Search ............ 280/33.991, 280/33.993, 642, 643, 647, 650, 657, 658; 297/250.1, 255, 256.1, 256.13, 256.14, 256.16
See application file for complete search history.

(56) References Cited

U.S. PATENT DOCUMENTS

| | | | | |
|---|---|---|---|---|
| 5,213,360 A * | 5/1993 | Lin | ............................... | 280/648 |
| 5,354,079 A * | 10/1994 | Hettenbach | .............. | 280/33.991 |
| D363,589 S * | 10/1995 | Lafleur et al. | ................. | D34/21 |
| 5,664,795 A | 9/1997 | Haung | | |
| 5,810,437 A * | 9/1998 | Sharpe | ...................... | 297/256.17 |
| 6,161,848 A * | 12/2000 | Beumer et al. | ........... | 280/33.991 |
| 6,494,531 B1 * | 12/2002 | Kim | ................................ | 297/94 |
| 6,702,316 B2 * | 3/2004 | Hsia | .............................. | 280/648 |
| 6,877,761 B2 * | 4/2005 | Hsia | .............................. | 280/642 |
| 6,880,850 B2 * | 4/2005 | Hsia | .............................. | 280/642 |
| 2003/0030252 A1 | 2/2003 | Huang | | |

FOREIGN PATENT DOCUMENTS

| | | |
|---|---|---|
| FR | 2 798 349 | 3/2001 |
| GB | 1 412 580 | 11/1975 |
| JP | 06-135271 | 5/1994 |
| WO | 03/035448 | 5/2003 |

* cited by examiner

*Primary Examiner* — Frank Vanaman
(74) *Attorney, Agent, or Firm* — Oblon, Spivak, McClelland, Maier & Neustadt, L.L.P.

(57) ABSTRACT

A trolley including a frame and a supporting part connected to the frame, one side of which forms part of an infant seat or a baby seat. Another side of the supporting part disposed opposite the one side forms part of the baby seat. The supporting part is detachably or pivotally connected to the frame. No complex operations are required on the part of the parents or attendants for adapting the trolley to requirements of either a baby or a child. One side of the supporting part forms part of the infant seat, while the opposite side of the supporting part forms—possibly the entire—baby seat after simply being turned. This enhances ease of conversion and makes the trolley more universal, safer and more suitable for use by the average user at seaports or airports, in stations or in shopping centers or supermarkets.

19 Claims, 2 Drawing Sheets

TROLLEY

FIELD OF THE INVENTION

The present invention relates to a trolley comprising a frame and a supporting part connected to the frame, one side of which forms part of an infant seat or a baby seat.

BACKGROUND OF THE INVENTION

Such a trolley is known from WO 03/035448. The trolley that is known therefrom is used as a—usually collapsible and nestable—trolley for carrying luggage and/or an infant/baby, for example when shopping. The trolley comprises a lightweight frame fitted with wheels and a handle, as well as a supporting part that is detachably connected to the frame. When the supporting part is fastened to the frame in a first position, it forms a seat that can be folded down to receive a baby. On the other hand, when the supporting part is fastened to the frame in a second, reversed position, the same supporting part forms an infant seat that can be folded up to receive an infant. In both positions the same side of the supporting part is used for receiving the baby or the infant.

A drawback of the known trolley is that the conversion from infant seat to baby seat, or vice versa, requires fairly complex operations to be carried out generally by the user or the consumer.

SUMMARY OF THE INVENTION

The object of the present invention is to provide a more user-friendly trolley that any one can use in a simple manner for infants and babies in a larger number of circumstances and a wider range of applications, for example at airports, amusement parks and the like.

In order to accomplish that object, the trolley according to the invention is characterized in that another side of the supporting part disposed opposite said one side forms part of a baby seat.

The advantage of the trolley according to the invention is that the conversion from infant seat to baby seat, and vice versa, does not require the reversal of the supporting part, so that no complex operations are required on the part of the parents or the attendants for adapting the trolley to the requirements of either a baby or an infant.

One side of the supporting part forms part of the infant seat, while the opposite side of the supporting part simply forms (possibly the entire) baby seat. The enhanced ease of conversion has made the trolley more universal and safer to use, also by users without any technical knowledge, in a wider variety of circumstances —such as in particular such amusement centers, shopping centers, supermarkets, stations, seaports and airports, both before and after clearance through Customs, in which users are simply not prepared or able to pay attention, or only less so, to such trolleys.

One embodiment of the trolley according to the invention is characterized in that the supporting part is detachably or pivotally connected to the frame.

Although the supporting part may be detachably connected to the frame in an advantageous, simple embodiment, it is preferable in practice for the supporting part to be pivotable. In the latter case, the supporting part cannot come loose or be lost, while furthermore the conversion between the infant seat and baby seat positions can be realized in a very simple manner by turning over, swinging back or tilting the supporting part.

Further embodiments of the trolley according to the invention that are considered to be very important in practice are defined in the dependent claims.

BRIEF DESCRIPTION OF THE DRAWINGS

The trolley according to the present invention will now be explained in greater detail with reference to the figures below, in which corresponding parts are indicated by the same numerals. In the figures.

DESCRIPTION OF THE PREFERRED EMBODIMENTS

Figure 1:
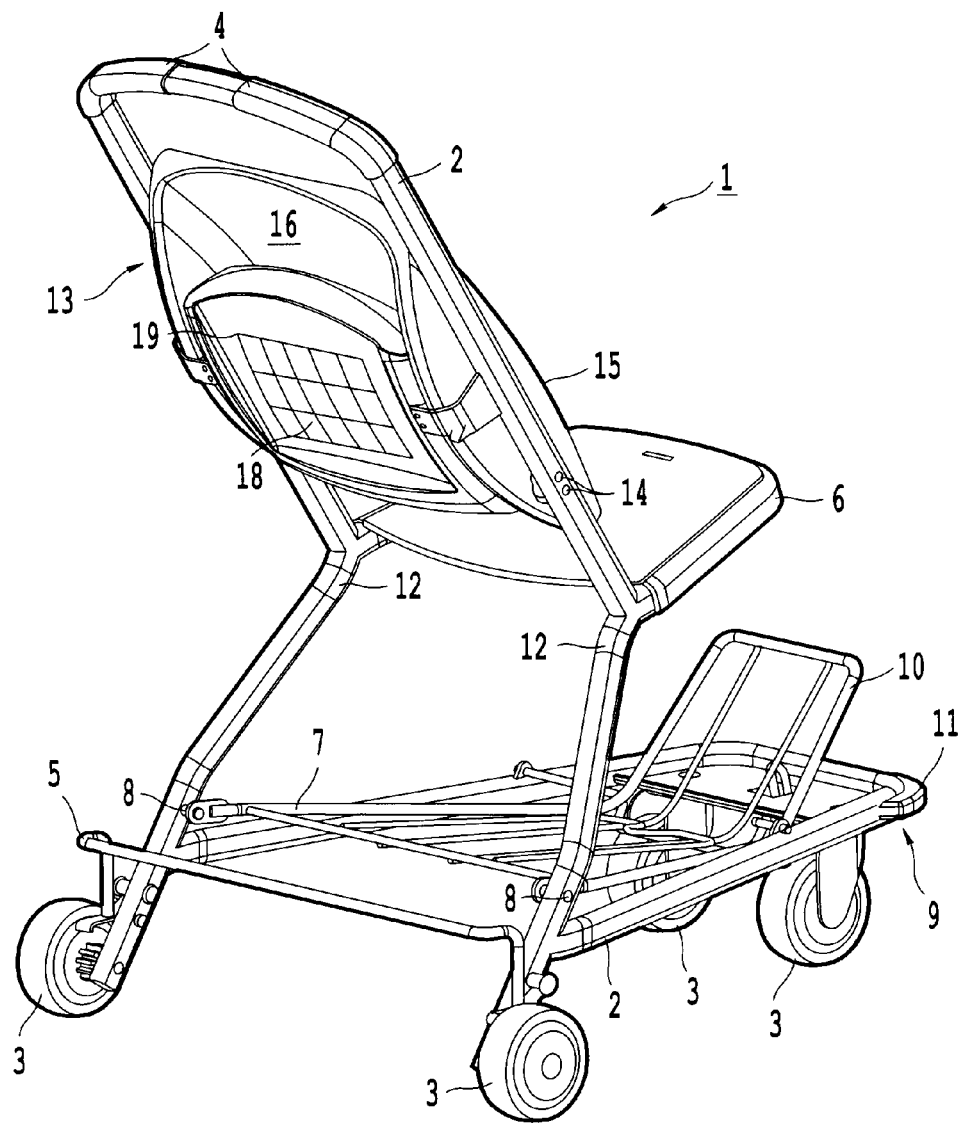
FIG. 1 is a perspective view of the trolley according to the invention.
Figure 2:
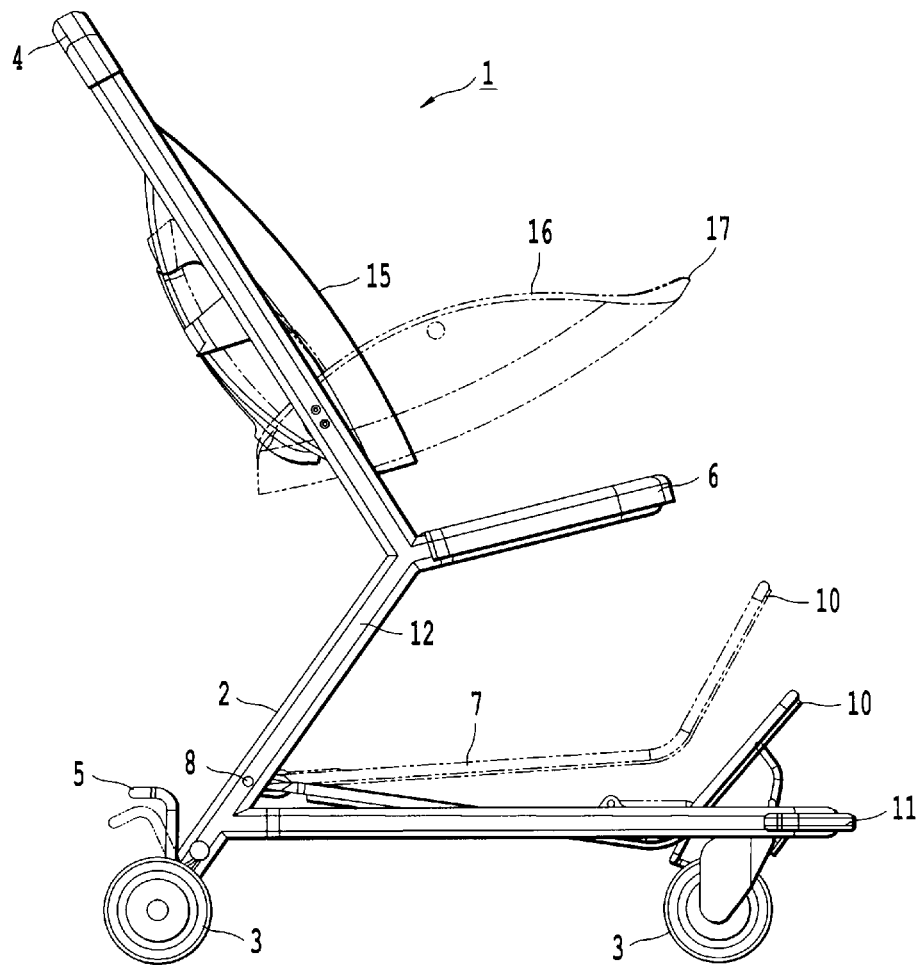
FIG. 2 is a right-hand side elevation of the trolley of FIG. 1.

FIGS. 1 and 2 show a multifunctional trolley 1 that is built up around a generally light-metal, wire or tubular frame 2 which is easy to clean, to which means in the form of wheels 3 are mounted for manually moving the trolley by means of a handle 4 fixed to the frame 2. The wheels 3 can be braked by a foot-operated (in this embodiment) brake 5. A seat 6 is fixedly connected to the frame, which seat can be collapsed and/or be detached from the frame 2 in a manner that is not shown, if desired. If necessary, one or more cross connections (not shown) may be provided, for example in the side faces of the frame 2, so as to obtain additional mechanical strength, which cross connections function to support the larger forces to which the seat 6 is exposed in case adults seat themselves thereon.

As is furthermore shown in the figures, the trolley 1 comprises a luggage rack 7 connected to the frame 2, which is positioned under the seat 6 in this embodiment. The luggage rack 7 may be detachably, fixedly or, as shown herein, pivotally connected to the frame 2 at pivot points 8. When the trolleys 1, which are conical at their front side 9, are being pushed into one another, or nested, the partially raised front 10 of the luggage rack can move up, which is illustrated in a dashed line in FIG. 2, so as to facilitate said nesting. In addition, according to one feature of the trolley 1, the trolleys will be easy to move as a whole either by pushing or by pulling once they are nested. The raised front 10 furthermore prevents the luggage that is present thereon from sliding off undesirably. The conical front 9 of the trolley 1 is provided with a bumper 11 made of an elastic material.

The trolley 1 furthermore comprises a supporting part 13 provided between forwardly sloping uprights 12 of the frame 2 (in this embodiment). The supporting part might be detachably connected to the frame 2, but in the illustrated embodiment the supporting part is pivotally connected to the uprights 12 at pivot points 14. In a first, raised position of the supporting part 13 as shown in the two figures, a flat side 15 of the supporting part 13 functions as a back support for a child or for an adult being seated on the seat 6. In this manner, the flat side 15 forms part of an infant seat in the first position of the supporting part 13, of which infant seat also the seat 6 forms part.

Usually a safety harness or belt will be attached to the trolley 1 to prevent the infant from falling off. If desired, small armrests or handles, whether or not collapsible, may be provided on either side of the seat 6.

In an exemplary embodiment, the seat 6 includes an edge opposite from the uprights 12 such that in the raised position as shown in FIG. 1, the entire seat 6 lacks forwardly spaced elements in an area extending upwardly from a plane extending from the edge of the seat 6. The seat 6 may also include lateral edges on sides of the uprights 12 such that in the raised position, the entire seat 6 lacks laterally spaced elements in an area extending upwardly from a plane extending from the side edges of the seat 6.

Positioned opposite the flat side 15 of the supporting part 13 is a flat side 16 configured as a baby seat or a bowl-shaped reclining surface for a baby. From the first raised position of the supporting part 13, the supporting part 13 can be hooked to the frame 2 insofar as the supporting part 13 can be detached from the frame 2. The supporting part may also be manually pivoted down into one fixed position or one of several positions, if desired, insofar as the supporting part 13 is pivotable with respect to the frame 2, as shown. In the second position of the supporting part 13 thus obtained, the flat side 16 will be positioned at the top, on which flat side the baby can be placed. In this manner the other side 16 forms part of the baby seat in the second position of the supporting part 13.

For hygienic reasons, a tissue, for example obtained from a locally available paper dispenser, is laid on the baby seat, which tissue can be easily removed again after use, so that in particular the baby seat will remain clean.

If desired an edge 17, which is to be raised or which is already raised, may be provided at the head of the baby seat 16, which is preferably bowl-shaped, so that the baby will not slide off the baby seat 16.

A part 18 fixedly connected to the frame 2 (in this embodiment) functions on the one hand as a footrest for the baby that lies in the folded-down baby seat 16, while on the other hand a net 19 (schematically shown) may be fixed to said part, in which net small pieces of luggage or magazines may be placed. Furthermore, one or more hooks may be attached to the frame for carrying bags.

The invention claimed is:

1. A trolley, comprising:
   a frame;
   a pair of uprights extending outwardly from said frame;
   a first seat connected to and extending outwardly from said pair of uprights; and
   a supporting part connected to and positioned between the uprights above said first seat, wherein
   the supporting part has a first side opposite a second side and pivots between a first upright position in which a first side of said supporting part forms a backrest for a person sitting on said first seat and a second lowered position substantially parallel to the ground in which a second side of the supporting part forms a second seat configured as a baby seat,
   the first seat includes a front edge opposite from the uprights such that in the first position, the entire first seat lacks forwardly spaced elements in an area extending upwardly from a plane extending from the front edge of the first seat,
   the trolley further comprises a luggage rack connected to the frame and positioned under the supporting part, and
   the frame of the trolley narrows from a back of the trolley to a front of the trolley such that the trolley is configured to be pushed into or nested in another one of the trolleys and the luggage rack is pushed upwards as a result of the nesting.

2. The trolley according to claim 1, wherein the supporting part is detachably or pivotally connected to a handle of the frame.

3. The trolley according to claim 1, wherein in the first position, the supporting part is in a substantially raised position and in the second position, the supporting part is in a substantially lowered and reclining position.

4. The trolley according to claim 1, wherein the second side of the supporting part is bowl-shaped.

5. The trolley according to claim 1, wherein the first seat is fixedly connected to the frame.

6. The trolley according to claim 1, wherein the luggage rack is detachably, or pivotally connected to the frame.

7. The trolley according to claim 1, wherein said second side of said supporting part comprises a reclining surface for a baby.

8. The trolley according to claim 1, wherein the supporting part by itself forms an entirety of the baby seat.

9. The trolley according to claim 1, wherein the supporting part in the second position is disposed above and substantially parallel to the first seat.

10. The trolley according to claim 1, wherein the first seat is spaced from the second seat.

11. The trolley according to claim 1, wherein the first seat includes lateral edges on sides of the uprights such that in the first position, the entire first seat lacks laterally spaced elements in an area extending upwardly from a plane extending from the side edges of the first seat.

12. The trolley according to claim 1, wherein the first seat is disposed at a height such that an adult can be seated on the first seat.

13. The trolley according to claim 1, wherein the supporting part is detachably connected to a handle of the frame.

14. A trolley, comprising:
    a frame;
    a seat connected to the frame; and
    a supporting part connected to the frame, wherein
    a front side of the supporting part forms a back rest for a seat in a first position, and a back side of the supporting part disposed opposite the front side in a second position comprises a reclining surface for supporting a baby or infant in a reclining position such that the baby lies in the baby seat substantially horizontal relative to the ground,
    the supporting part in the second position is disposed above, spaced from, and substantially parallel to the seat,
    the back side of the supporting part includes raised edges to prevent a baby from sliding off the baby seat,
    the trolley further comprises a luggage rack connected to the frame and positioned under the supporting part, and
    the frame of the trolley narrows from a back of the trolley to a front of the trolley such that the trolley is configured to be pushed into or nested in another one of the trolleys and the luggage rack is pushed upwards as a result of the nesting.

15. The trolley according to claim 14, wherein the supporting part by itself forms an entirety of the baby seat.

16. The trolley according to claim 14, wherein the seat includes a front edge opposite from a handle of the frame such that in the first position, the entire seat lacks forwardly spaced elements in an area extending upwardly from a plane extending from the front edge of the seat.

17. The trolley according to claim 14, wherein the supporting part is detachably or pivotally connected to a handle of the frame.

18. The trolley according to claim 14, wherein in the first position, the supporting part is in a substantially raised position and in the second position, the supporting part is in a substantially lowered and reclining position.

19. The trolley according to claim 14, wherein the back side of the supporting part is bowl-shaped.

* * * * *